US012007980B2

(12) United States Patent
Fehling et al.

(10) Patent No.: US 12,007,980 B2
(45) Date of Patent: Jun. 11, 2024

(54) AI-DRIVEN TRANSACTION MANAGEMENT SYSTEM

(71) Applicant: THE BOSTON CONSULTING GROUP, INC., Boston, MA (US)

(72) Inventors: Ronny Fehling, Munich (DE); Samantha Short, London (GB); Axel de Goursac, Paris (FR); Raphael Dubois, Paris (FR); Jörg Erlebach, Frankfurt (DE); Karin Von Funck, Munich (DE)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 221 days.

(21) Appl. No.: 16/251,051

(22) Filed: Jan. 17, 2019

(65) Prior Publication Data

US 2020/0233857 A1    Jul. 23, 2020

(51) Int. Cl.
*G06F 16/23* (2019.01)
*G06F 16/28* (2019.01)
(Continued)

(52) U.S. Cl.
CPC ...... *G06F 16/2379* (2019.01); *G06F 16/2358* (2019.01); *G06F 16/285* (2019.01);
(Continued)

(58) Field of Classification Search
CPC .......................... G06F 16/215; G06F 16/2379
See application file for complete search history.

(56) References Cited

U.S. PATENT DOCUMENTS 7,249,717 B2    7/2007    Kotovich et al.
8,620,919 B2    12/2013   Gates et al.
(Continued)

FOREIGN PATENT DOCUMENTS

RU    2388053 C1    4/2010
RU    2625050 C1    7/2017
WO    2012/097430 A1    7/2012

OTHER PUBLICATIONS

M. J. Kusner et al., "From Word Embeddings to Document Distances", Proceedings of the 32$^{nd}$ International Conference on Machine Learning, 2015.

(Continued)

*Primary Examiner* — Mohammad S Rostami
(74) *Attorney, Agent, or Firm* — Hogan Lovells US LLP

(57) ABSTRACT

A largely automated method of categorizing spend data is provided that does not require a prior in-depth knowledge of an organization's transactional data. Natural language processing is applied to text data from transactional data to generate a consolidated cleaned data set (CDS) containing information for categorization. Logs for transactions are clustered based on similarity, forming the minimal data set (MDS). An automated algorithm selects a subset of high-value clusters that are categorized by requesting users to manually categorize one or more representative logs from each cluster of the subset. A model is then trained using the subset of manually categorized clusters and used to predict spend categories for the remaining logs with high accuracy. The AI engine automatically analyzes the predictions based on client context and either auto-tunes the machine learning model or identifies a new subset of clusters to be manually categorized. This loop may continue until 95%-100% of the spend is categorized.

20 Claims, 8 Drawing Sheets

(51) Int. Cl.
  *G06F 40/40* (2020.01)
  *G06N 5/04* (2023.01)
  *G06N 20/00* (2019.01)
  *G06Q 10/0631* (2023.01)
  *G06Q 10/067* (2023.01)

(52) U.S. Cl.
  CPC .............. *G06F 40/40* (2020.01); *G06N 5/04* (2013.01); *G06N 20/00* (2019.01); *G06Q 10/06315* (2013.01); *G06Q 10/067* (2013.01)

(56) References Cited

U.S. PATENT DOCUMENTS

| | | | |
|---|---|---|---|
| 10,546,056 B1* | 1/2020 | Cervelli | G06F 16/215 |
| 2009/0234683 A1 | 9/2009 | Anderson et al. | |
| 2013/0254294 A1* | 9/2013 | Isaksson | G06Q 30/0251 709/204 |
| 2015/0088959 A1 | 3/2015 | Doddavula | |
| 2016/0117702 A1* | 4/2016 | Chigurupati | G06F 16/2291 705/7.33 |
| 2016/0255139 A1* | 9/2016 | Rathod | H04L 51/046 709/203 |
| 2016/0260430 A1* | 9/2016 | Panemangalore | G10L 15/1822 |
| 2017/0308557 A1* | 10/2017 | Cassidy | G06F 12/0253 |
| 2017/0357710 A1* | 12/2017 | Shtossel | G06F 16/2455 |
| 2018/0089304 A1* | 3/2018 | Vizer | G06F 16/287 |
| 2018/0089585 A1* | 3/2018 | Rickard, Jr. | G06N 20/00 |
| 2018/0102938 A1* | 4/2018 | Yoon | G06F 16/358 |
| 2018/0144041 A1* | 5/2018 | Chen | G06F 9/466 |
| 2018/0276290 A1* | 9/2018 | Bhattacharya | G06F 16/345 |
| 2018/0357299 A1 | 12/2018 | Miranda | |
| 2019/0005502 A1* | 1/2019 | Kumar | G06Q 20/4016 |
| 2019/0079965 A1* | 3/2019 | Pareek | G06F 16/1865 |
| 2019/0236160 A1* | 8/2019 | Wang | G06F 16/358 |
| 2019/0266635 A1* | 8/2019 | Agarwal | G06N 5/04 |
| 2019/0272482 A1* | 9/2019 | Patil | G06N 20/00 |
| 2019/0340533 A1* | 11/2019 | Copper | G06N 3/0454 |
| 2019/0370347 A1* | 12/2019 | Levy | G06F 16/355 |
| 2019/0392285 A1* | 12/2019 | Manaharlal Kakkad | G06F 40/30 |
| 2020/0042611 A1* | 2/2020 | Sparrow | G06N 3/04 |
| 2020/0074320 A1* | 3/2020 | Seshadri | G06N 20/00 |
| 2020/0126144 A1* | 4/2020 | Shao | G06N 5/04 |
| 2020/0184487 A1* | 6/2020 | Pandya | H04L 63/1441 |
| 2020/0195663 A1* | 6/2020 | Achituve | G06N 3/126 |
| 2020/0341954 A1* | 10/2020 | Chetia | G06F 16/906 |
| 2020/0394564 A1* | 12/2020 | Singh | G06N 5/003 |

OTHER PUBLICATIONS

Nistér et al., "Scalable Recognition with a Vocabulary Tree," Proceedings of the Institute of Electrical and Electronics Engineers (IEEE) Conference on Computer Vision and Pattern Recognition (CVPR), 2006.

"The Ward Method" introduced in Ward, J. H., "Hierarchical Grouping to Optimize an Objective Function", Journal of the American Statistical Association, 1963.

Ester, M. et al., "A density-based algorithm for discovering clusters in large spatial databases with noise", Proceedings of the Second International Conference on Knowledge Discovery and Data Mining (KDD-96), 1996.

Communication Pursuant to Article 94(3) issued in related EP 20151010.4 dated Oct. 15, 2021.

Extended European Search Report issued in related EP patent application No. 20151010.4 dated Apr. 6, 2020.

Examination report issued in related IN patent application No. 202014001200 dated Feb. 2, 2022.

Office Action issued in related RU patent application No. 2020101484 dated Feb. 11, 2022.

First Office Action issued in JP Application No. 2020-005928, dated Jan. 12, 2024.

First Office Action issued in CN Application No. 202010046846.4, dated Jan. 16, 2024.

Intimation of the grant of and recordal of patent issued in IN Patent Application No. 202014001200, dated Feb. 16, 2024.

* cited by examiner

SPEND MATRIX: Company XYZ

| Level 1 (104a) | Level 2 (104b) | Level 3 (104c) | Country 1 | Country 2 | Country 2 (108) |
|---|---|---|---|---|---|
| Services & Professional Fees | Insurance | Product liability & war. | $ X.XXM | $ X.XXM | $ X.XXM |
| | | Property | $ X.XXM | $ X.XXM | $ X.XXM |
| | | Unmapped | $ X.XXM | $ X.XXM | $ X.XXM |
| | Legal | Outsourced Legal Fees | $ X.XXM | $ X.XXM | $ X.XXM |
| | Product Develo... | Certification | $ X.XXM | $ X.XXM | $ X.XXM |
| | | Patents & Trademarks | $ X.XXM | $ X.XXM | $ X.XXM |
| | | Product Development | $ X.XXM | $ X.XXM | $ X.XXM |
| | | Quality Assurance | $ X.XXM | $ X.XXM | $ X.XXM |
| | | Unmapped | $ X.XXM | $ X.XXM | $ X.XXM |
| | Supervisory Bo... | Supervisory Board mem... | $ X.XXM | $ X.XXM | $ X.XXM |
| | Unmapped | Unmapped | $ X.XXM | $ X.XXM | $ X.XXM |
| Travel & Expenses | Accommodations | Hotel Costs | $ X.XXM | $ X.XXM | $ X.XXM |
| | Agency Fees | Travel Agency related f... | $ X.XXM | $ X.XXM | $ X.XXM |
| | Travel | Airfare (110) | $ X.XXM | $ X.XXM | $ X.XXM |
| | ... | | ... | ... | ... |

FIG. 1B

Supplier Name  Supplier Address Line 1
..........................Line 2
..........................Line 3

Invoice #:54XDR3            Date: 1/1/2018

Description                        Amount

Item X                             $XX.XX
Service Y                          $XX.XX
Service Z                          $XX.XX
               Subtotal:           $XX.XX
               Tax:                $XX.XX
               Total (USD):        $XX.XX Other Comments:           Payment Information:
Project Code: ....        Account No.: ...
Buisness Unit: ...        ...

FIG. 2A

[English translation]: Customer. Cvr. no. intermetkode Web Access Code Removable number Invoice number 824553 93484217 94905 JnIV18tH 571393115884309303 43843056021 Attn .: Agnethe Jepsen, 914 Marsk Stigs Vej 8800 Viborg J, Page 1 of 2 Statement 01/01/2017 - 31/01/2017 520d Parkhøjen, 8870 Langå C El Tax Statement Total 569.02 Â£ 142.26 Â£ 711.28 Â£ Miscellaneous (taxes, interest and services) 29.00 Kr. Total due on 1/3/2017 740.28 Kr. On the following pages you can see how the inventory is calculated. Register Payment Service and save 29, - pr. account Register your account to direct debit and save administration fee of 29 kr. per. bill. Everything runs automatically, and your bills are paid on time - either sooner or later. If you are a business, you should instead enroll your bill to the Supplier Service.

| | Log 1 | Log 2 | Log 3 | Log 4 | Log 5 | Log 6 | Log 7 | Log 8 |
|---|---|---|---|---|---|---|---|---|
| Term(s) 1 | 1 | 0 | 1 | 0 | 0 | 0 | 1 | 0 |
| Term(s) 2 | 0 | 1 | 0 | 0 | 0 | 1 | 0 | 1 |
| Term(s) 3 | 0 | 0 | 1 | 1 | 0 | 0 | 0 | 0 |
| Term(s) 4 | 1 | 0 | 1 | 1 | 0 | 0 | 1 | 0 |
| Term(s) 5 | 0 | 0 | 0 | 0 | 1 | 0 | 0 | 0 |
| Term(s) 6 | 0 | 0 | 1 | 1 | 0 | 0 | 0 | 0 |
| Term(s) 7 | 0 | 0 | 0 | 0 | 0 | 1 | 0 | 0 |
| Term(s) 8 | 0 | 0 | 0 | 0 | 0 | 0 | 0 | 0 |

304 ← Term(s) 4 row
302 ← Log 4 column

AI-DRIVEN TRANSACTION MANAGEMENT SYSTEM

BACKGROUND

Budgeting is a critical aspect for organizations to bring transparency to their costs and provide an opportunity to improve their bottom line. Zero-based budgeting (ZBB) is a method of budgeting in which budgets are effectively built from zero, forcing a re-evaluation by cost owners of their expenses. Budgets are generated through an examination of the activities, using price and consumption levers to evaluate a business' spend requirements for the upcoming period, regardless of whether each budget is higher or lower than the previous one. ZBB allows top-level strategic goals to be driven through the budgeting process by tying the budget and respective spend to specific functions, locations and business units, and groups costs and therefore strategic priorities in a manner that enables measurement against previous results and current expectations.

While zero-based budgeting can help lower costs by avoiding typical budgeting pitfalls such as blanket increases or decreases to a prior period's budget, it is generally a time-consuming process that takes much longer than traditional, cost-based budgeting. In some cases, to understand the true nature of the price and consumption drivers, and to understand which parts of the spend have clear value and which parts are waste, organizations will use transactional data. In some cases, this may require thousands or millions of transactions to be sorted, classified and categorized. Inaccurate classification by accounting, unorganized record keeping, inefficient storage, and other related problems with the underlying financial data make it difficult to review such drivers and to re-categorize expenses accurately. Conventional approaches require significant human efforts to reclassify data, often requiring the work of hundreds of individuals to review and reclassify transactional level data into the relevant cost categories. However, human categorization can be a victim of larger issues, as cost classification knowledge by different individuals may result in very in-transparent and non-replicable categorization. In some more recent approaches to assessing and classification of transactional level-data, machine learning techniques are used to supplement this manual effort. Even these approaches require an in-depth knowledge of the specific data set for these to be accurately categorized. While these approaches may be successful in reducing manual categorization of spend data, models and systems for classifying spend data are often highly specific to the clients and their business. Models used for categorizing data are generally not transferable to other clients, specifically those in different industry sectors. As a result, the accuracy of these models is generally insufficient.

BRIEF DESCRIPTION OF THE DRAWINGS

Various embodiments in accordance with the present disclosure will be described with reference to the drawings, in which:

FIGS. 1A and 1B depict an application interface for presenting categorized spend data and allowing a user to explore spend data.

FIGS. 2A and 2B depict examples of logs or invoices that may be included in raw spend data.

DETAILED DESCRIPTION

Figure 1A:
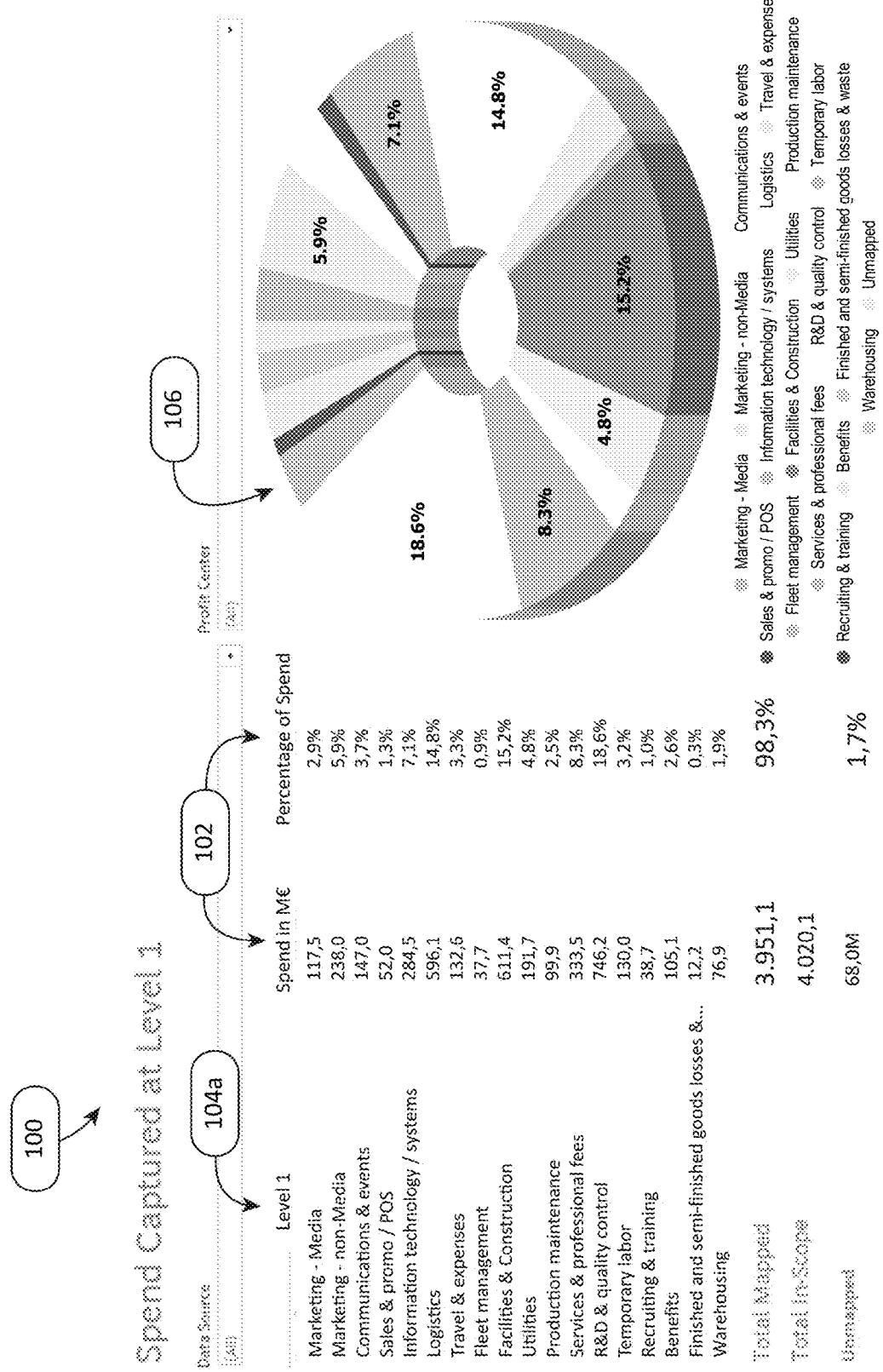

Systems and methods in accordance with various embodiments of the present disclosure may overcome one or more of the aforementioned and other deficiencies experienced in conventional approaches to categorizing and analyzing data.

In particular, various embodiments described herein provide methods for categorizing spend data which may include general ledger (GL), accounts payable (AP), purchase order (PO) information, including but not limited to transactions, invoices, expenditure receipts, supplier-based data sets and other documented expenses, herein collectively referred to as spend logs (or simply logs). After collecting spend data from all relevant data systems and/or sources, the data is processed and consolidated to generate a cleaned data set (CDS). The CDS includes spend data that has been filtered to remove less important information and/or processed to standardize information used for log categorization. In some cases, the CDS includes an organized structure that breaks spend information down by field types (e.g., total cost, vendor, transaction date, etc.). In some cases, standardizing spend data involves applying natural language processing operations to text information associated with logs. Logs from the CDS are then clustered into groups based on a similarity of words, costs, dates, or other patterns and features, which generates a new data set of smaller size: the minimal data set (MDS). The MDS constitutes groups of logs representing the same type of transaction (e.g. "Taxi fare" and "Supplier A"). Based on clustering operations, each log within the same cluster can be mapped to the same cost category.

In some cases, a hierarchical category structure is determined at least in part on the clustering structure, and in some cases, a category structure is based on particular client needs. The logs are then tagged or categorized in phases, where one or more representative logs from each cluster are used to determine category information for each of the logs associated with the cluster. In phase one, some of the logs or clusters may be categorized by a smart algorithm and predetermined rules—for instance, logs or clusters meeting specific criteria and including client context information (e.g., including an account structure) may automatically be categorized. In the second phase, high-value clusters are selected and manually categorized. In a third phase, a machine learning model is trained using the categorized spend data and is used to categorize the remaining uncategorized spend data automatically. In some cases, a Human-in-the-Loop (HITL) method can be used to increase the accuracy of the categorization. Hereby, an algorithm determines the quality of the model prediction performance. If it determines the quality for a portion of the spend to be below a specific threshold, the algorithm either adjusts the model parameters or identifies additional logs to be categorized manually. Phases two and three are then repeated until 95-100% of the spend is categorized.

Unlike conventional methods, the methods disclosed herein are appropriate even when there is not a prior in-depth knowledge of the client's practice. For example, extensive databases of prior categorization (e.g., by supplier matching) are not necessary when using the disclosed methods. Through operations of generating an MDS of spend data, clustering logs corresponding to similar transactions, and requesting user categorization of the high-value clusters a suitable training set of data can quickly be acquired that is appropriate for training models that can, in turn, be used to automatically categorize remaining logs with a high degree of accuracy. By clustering logs, the number of category determinations is greatly reduced which in turn makes the process faster and less resource intensive. The disclosed methods further allow for machine learning techniques that allow the process to become less labor-intensive and more accurate over time. These and other advantages will be made apparent in the following description.

FIG. 1A depicts an application for presenting categorized spend data to a user, often referred to as a spend cube. In the depicted interface 100, expense totals 102 for various level 1 categories 104a are depicted, as well as visual data 106 (graphs, charts, diagrams, and the like) for conveying the breakdown of categorized spend data to a user. An interface may provide a variety of user selectable features for allowing a user to explore the spend data—allowing a user to quickly understand the state of the organization's spending over a selected period (e.g., a 1 month, 6 months, 1 year, or another selected amount for which spend data has been provided). The spend cube allows a user to see how the spend is distributed across and between organizational units of a company, providing transparency on the most granular level across all cost packages.

FIG. 1B depicts a screenshot 101 provided by the application showing a higher resolution view of categorized spend data and thus allowing for more in-depth analysis than shown by the screenshot in FIG. 1A. The additional detail is provided using a hierarchical category structure in which various expense logs are categorized. In the depicted interface, each level 1 category 104a is made of one or more level 2 categories 104b, and each level 2 category is in turn made of one or more level 3 categories 104c. While a three-tier hierarchical structure is depicted, there may be more or fewer tiers. In some cases, spend data may be searched or displayed based on one or more log or invoice categories that do not fall within the hierarchical category structure. This can be done in the context of spend categories 104a-c. For instance, the property expenses 108 for an international organization may be broken down by countries in which an organization operates. In some cases, a user may filter spend data based on expense logs that satisfy date criteria, location criteria, department criteria, or any other selected criteria that may be useful for classifying expense data. In other cases, a user can search spend data based on an alternate hierarchical category structure. For instance, a user may be able to choose an alternate hierarchal category structure to see how costs are distributed amongst various organizational units of the company such as business units, sub-business units or regions, countries, and the like.

In some cases, an application may be used to calculate cost metrics based on the categorized spend data. In some cases, an application may provide a user with recommendations or warnings based on spend data. For instance, an application might alert a user that a particular spend category has been highly variable over past budgeting periods and that the user or organization should plan accordingly or investigate the source of variability. It is appreciated that many software tools for presenting and further analyzing spend data known now or later developed may be used with categorized data sets produced by the methods described herein. For the sake of brevity, such known tools for analyzing and presenting spend data are not discussed in great detail here.

As used herein, a client may be any organization, business, individual, group, or entity which maintains logs of business expenses (also referred to as the client's spend). Generally, the methods described herein would be executed by a party other than the client. However, this need not be the case. Typically a client's data requirements are determined prior to the categorization of spend data. Determining data requirements can include, e.g., determining how many levels of a hierarchical category structure will be used, or what additional categories logs will be associated with. For instance, some clients may wish to have expenses classified by a geographical location, date, associated personnel, and the like. In some cases, clients may already be using a hierarchical category structure that would like expense logs to be categorized with.

In some cases, a more basic categorization of spend data (e.g., fewer tiers to category structure) can be provided to a client at a reduced cost. A preparation phase of determining client requirements can also be used to determine or estimate the level detail to which spend data can be categorized. For instance, if a majority of a client's expense records are incomplete or lack sufficient detail, a client can be advised how the confidence of the results may be affected and to what detail (e.g., how many tiers) expense logs can be categorized. In some cases, this phase includes a manual or automated review of client data including profit & loss statements, general ledgers, AP and PO Accrual Reconciliation Reports. Typically, this is done to demonstrate to a client the value potential of the full spend categorization. As experience shows, it is especially at the granular level where significant savings potential is lost due to lack of spend transparency.

After the data requirements are determined the raw spend data is consolidated. Raw spend raw data may include, e.g., paper and electronic copies of invoices and receipts and other documentation of business expenses. In some cases, the raw spend data may need to be scanned and digitized from paper records. In some cases, raw spend data may include invoices that have been scanned (e.g., a JPEG, PDF, PNG images) but do not have searchable text. In some cases, expense logs may be in a variety of languages. In such cases, text from image data can be recognized using advanced optical character recognition (OCR) techniques. Depending on the quality of a client's records, gathering data may include various migration, transcription, decoding, and encoding operations.

When consolidating raw spend data, logs are stored in a common database, herein referred to as a cost database. The cost database may be, e.g., a Structured Query Language (SQL) database, or any other relational or non-relational database. The database may be consolidated on a single memory device, distributed across many storage devices, or may be stored in, e.g., the cloud. In some cases, a cost database is only used to store logs for a single budgeting period, and in some cases, the cost database may include logs from past pay periods, which may be saved for purposes of comparison.

FIGS. 2A and 2B illustrate examples of logs that might be included in a turnover over of a client's raw spend data. FIG.

2A depicts an example of an invoice that is neatly formatted to aid in the readability of the listed fields. In conventional automated or manual operations, clear formatting of an invoice may increase the likelihood that essential data fields are identified correctly. In contrast, FIG. 2B depicts an invoice that does not include formatting which aids in recognition of spend data. The lack of formatting could be the result of a machine translation or a prior file type conversion. In some cases, logs may even be originally created without clear formatting. Expense logs, such as depicted in FIG. 2B make it difficult for humans to identify relevant information. These invoices can also result in errors when computers are used to analyze log data. Sometimes computers may combine text fields that should be separated which may result in an invalid or incoherent analysis of the spend data. For example, improper formatting might result in a date field being combined with a cost field. By applying natural language processing (NLP) techniques to log data, many of the formatting obstacles can be avoided. In some cases, NLP operations may be applied only to logs with formatting that prevents an automated analysis, and in some cases, NLP operations are applied to all logs to normalize the formatting of spend data.

To speed up the rate that logs are classified and categorized, the cost data is first cleaned and preprocessed to generate the consolidated cleaned data set (CDS). The CDS contains spend data with clean and intelligible descriptions where corrupt, duplicate or uninformative data is removed. Using the CDS as a basis for classifying logs greatly improves the efficiency and speed of categorization as non-essential information and obscuring formatting can be removed that might hinder human or computer's ability to process the log data quickly or accurately.

Generating the CDS may involve filtering operations to remove duplicate transactional data. Duplicate transaction data often arises when invoice data is saved to more than one location or saved multiple times within the client's records. Neglecting to identify these duplicate transactions may introduce error and require significantly more effort to correct at a later time. Worse yet, failure to identify duplicates may lead to poor budgeting if the budget is constructed on a premise of false data. In some cases, identical or matching entries may be determined and removed atomically based on a comparison of the text data for each log. In some cases, duplicate or matching logs are identified, and a user may be requested to verify that the logs are duplicates.

In generating the cleaned data set, various out-of-scope transactions such as depreciation, amortization and taxes can also be removed. In some cases, internal financial movements (e.g., accruals & reversals) are removed, as well as 'valueless' transactions, and logs which include corrupted data. To verify that the CDS is accurate and does not include out-of-scope or duplicate transactions, totals costs represented by log data in the CDS are compared to client baseline values as recorded in, e.g., a Profit & Loss statement for a corresponding period or a trial balance. If a substantial discrepancy or mismatch is identified, the difference can be reconciled by correcting identified errors in log or by adding additional logs in the cost database to account for transactions missing in the raw data. When the spend data in the CDS can be traced back to values indicated on a Profit & Loss statement (or another equivalent financial document) the subsequently categorized spend data can be trusted as accurately representing the total spend.

In generating the CDS, various natural language processing (NLP) steps are applied to the cost data to aid subsequent analysis of each transaction. These operations can aid in determining relevant keywords and in determining relationships between transactions for clustering. Some of these NLP operations include (1) conversion to lowercase text, (2) removing duplicate words, (3) removing punctuation, (4) removing non-alphanumeric characters, (5) removing numbers (in some cases, only from certain fields), (6) removing (in some cases) words that are less than a threshold number of characters (e.g., 2 characters), (7) removing codes identified as combinations of letters and numbers, (8) translating text to a single language (e.g., English), (9) lemmatizing words by converting words to their base dictionary form (e.g. "expenses" becomes "expense"), (10) removing month names and abbreviations, (11) removing stop words such as "for", "the", (12) removing city names, (13) removing proper nouns and names, (14) substituting the supplier family name if there is no supplier field, (15) removing a supplier name when present in full description, (16) selecting keywords based on predetermined lists or ad-hoc analysis like their occurrence of appearance in one/several categories, (17) using informative scoring like term frequency-inverse document frequency (TF-IDF), and (18) using Machine Learning models for Named Entity Recognition. It should be understood that there may be additional or fewer NLP operations applied to each log. Additionally, some NLP operations may only be applied to certain fields or portions of a transaction. For example, in some cases, NPL operations are only applied to invoice description fields and not to fields listing, e.g., a supplier name or a supplier's contact information.

After generating and validating the CDS, one or more clustering algorithms are used to cluster logs into groups based on similarity to build a minimal data set (MDS). When sufficiently similar, logs can be assumed to fall under the same category and can be tagged in bulk. This avoids the need to individually evaluate and categorize a plurality of similar logs that ultimately will receive the same category designation. For example, if a cluster has 500 logs, then all 500 expense logs may be categorized together rather than individually. This greatly reduces the effort needed to categorize logs in the cost database.

When clustering, the cleaned log data from the CDS is considered. In some embodiments, log vectors for each log are determined based on associated text included in the CDS. These log vectors are used to characterize logs by the words found in the logs. As mentioned, the CDS includes text for each expense log which has been processed with one or more natural language processing operations. The NLP operations executed on text data can include, e.g., removing stop words such as "a," "the," or "in" which do not convey significant meaning, removing proper nouns, and converting words to their base form. The NLP operations help standardize the text between logs so that they can be easily compared for clustering purposes.

In some cases, the cost database may include additional information that is not in the MDS. Such additional information may be referenced if a log cannot be categorized by information in the MDS alone, or to maintain detailed client records. Additional information may include, e.g., all of the text associated with an invoice or the placement and formatting of the text in an invoice. In some cases, aspects such as the font text size and relative spacing may even be characterized. In some cases, the additional data may include metadata from an electronic file such as a PDF associated with the invoice. The metadata information may include data such as a time stamp when the invoice was a created, a user account associated with creating the invoice, location data associated with the invoice, or system data of the machine which created the electronic file. In some cases, an image of the invoice may be recorded. This additional information may be helpful in, e.g., relating an expense log to other expense logs in the cost database. In some cases, additional information stored in the cost database may be accessed by a user through an application such as that depicted FIGS. 1A and 1B. For example, a user may request an itemized listing of transactions in a category and provide a selection prompting the additional information for one or more logs to be displayed. While provided as examples of "additional information," the data relating to these fields may be stored in the MDS in some cases, such as when the field has been identified as relevant for clustering or tagging log data.

Figures 3, 4:
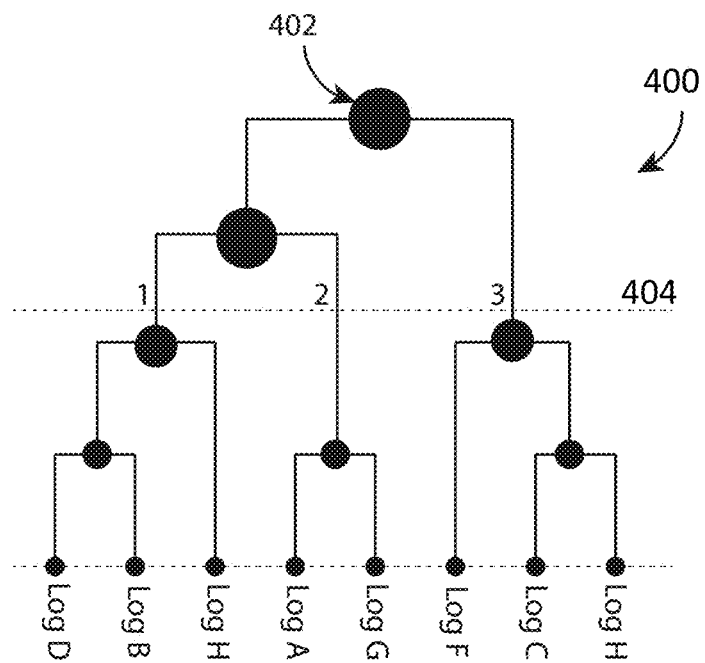
FIG. 3 depicts a term-occurrence matrix which may include log vectors describing characteristics of individual logs.
FIG. 4 depicts a dendrogram which shows one way in which logs can be hierarchically clustered.

In some embodiments, a dictionary of terms can be generated based on the words and common phrases found in the MDS. In some cases, as depicted in FIG. 3, a term-occurrence matrix 300 can be created which has log vectors 302 and term vectors 304. Log vectors can record various log features along a plurality of dimensions of the log. For instance, indices of log vectors may provide values indicating a number of occurrences of a term in the log or a value indicating some other characteristic (e.g., a cost, transaction time, transaction location, etc.). Term vectors 304 indicate, for a specific term, a number of occurrences of the term in each expense log. In some cases, a term vector may correspond to another characteristic such a dollar amount in which chase the indices of the vector would specify the dollar amount for each log.

In some cases, a term-occurrence matrix can be simplified, by, e.g., removing term vectors from the term-occurrence matrix that appear in a maximum threshold number of expense logs (e.g., terms that occur in more than 50%, 75%, or in some cases, 80% of expense logs). If a term appears in a majority of the logs, the term likely carries less meaning for categorization purposes. In some cases, terms from the dictionary may be determined to be irrelevant for tagging, and the corresponding term vectors can be removed from the term-occurrence matrix. In some cases, proper nouns and codes are replaced by an appropriate classification during the NLP operations. As examples, "New York" and "Berlin" might each be replaced with "city." Similarly, "Jun. 24, 2017," might be replaced with "date." In some embodiments, a term vector may relate to a dimension other than a number of occurrences of a word. For example, values in the vector may represent dimensional information of text displayed on the invoice, a pattern information text data, a time when the invoice was created, and the like. In some cases, term vectors can be removed from the term-occurrence matrix when the corresponding term is not found in the minimum threshold number of expense logs.

Clustering can account for word similarities and patterns between expense logs. For instance, reoccurring purchases are likely to use a unique set of words and data that may identify a purchased good or service, a vendor, a regular purchase interval, and the like. These patterns and similarities are reflected in the log vectors for expense logs and are used to group logs based on a similarity measure.

In addition, other log features can be derived using machine learning models using word embedding techniques such as Word2Vec, or GLOVE. Clustering can then use these feature vectors using various distance metrics like cosine similarity, Euclidean distance or specifically designed Word Mover distance ("From Word Embeddings To Document Distances", M. J. Kusner, Y. Sun, N. I. Kolkin, K. Q. Weinberger, Proceedings of the $32^{nd}$ International Conference on Machine Learning, 2015).

In some embodiments, if invoice descriptions have sufficient length, Latent Dirichlet Allocation (LDA) may also be used as an unsupervised algorithm to discover topics in invoice descriptions. For each log, the output may represent the relative weight of each topic associated with the text description of the log. This output is then embedded in the log vector and given as input features to the clustering algorithm.

FIG. 4 provides an illustrative representation of a hierarchical clustering structure 400 that can be used in accordance with various embodiments. This illustrative example depicts one way in which eight logs (Logs A-Log I) can be clustered. Clusters can exist at multiple levels ranging from each cluster representing a single log to a single cluster 402 at the root level which includes all of the logs. A desired similarity threshold 404 (in this example yielding 3 clusters) can be a selected parameter for a clustering operation. In some cases, a cluster can be broken into two or more sub-clusters using the respective log vectors of logs in the cluster if it is determined that a cluster includes logs represented distinct categories. Although FIG. 4 shows the clusters arranged hierarchically, non-hierarchical clusters may also be used. Additionally, more or fewer clusters may be created depending on the types and variety of the spend logs being analyzed.

The final spend categories are structured in a hierarchical tree. In some embodiments, a dendrogram (cluster tree) such as shown in FIG. 4 might reflect, at least in part, the spend category structure. In some cases, one or more categories may be suggested based on terms or other variables associated with the cluster. In some cases, a suggested category structure can be provided via an application interface with options for a user to edit category names or the category structure. For example, a user may be provided with an option to assign a number of tiers for the category structure or options to combine or divide categories.

The process of hierarchical clustering can include, for example, recursively partitioning the plurality of expense logs into clusters. In some embodiments, log vectors may be clustered using connectivity-based clustering techniques, and in some cases, log vectors are clustered using density-based clustering. In some embodiments, log vectors may be clustered utilizing a conventional hierarchical k-means clustering technique, such as that described in Nistér et al., "Scalable Recognition with a Vocabulary Tree," Proceedings of the Institute of Electrical and Electronics Engineers (IEEE) Conference on Computer Vision and Pattern Recognition (CVPR), 2006, the Ward method, introduced in Ward, J. H., "Hierarchical Grouping to Optimize an Objective Function", Journal of the American Statistical Association, 1963, or the DBSCAN algorithm, introduced in Ester, M. et al., "A density-based algorithm for discovering clusters in large spatial databases with noise", Proceedings of the Second International Conference on Knowledge Discovery and Data Mining (KDD-96), 1996. It is appreciated that in some embodiments, an in-depth knowledge of an industry can be used to adjust the similarity measure, for instance by adding weighting factors to the clustering process such that, a certain dimension of a log vector carry more weight than others. In some cases, weights and weighted values can be selected manually, and in some embodiments, weights can be determined over time using various machine learning techniques. It is appreciated that various clustering techniques known in the art may be used to cluster log vectors.

When logs are clustered into like groups of logs having the same categorical designation, the effort for categorizing spend data is significantly reduced. For example, if the cost database has 8,000,000 logs, these transactions might be grouped into less than about 500,000 clusters. In this example, the number of decisions needed for categorizing all of the logs would be reduced to a factor of about ¹⁄₁₆th. In some cases, clustering operations are used to group logs into clusters numbering less than about ¹⁄₁₀ of the number of logs, and in some cases, and in some cases to group logs into clusters numbering less than about ¹⁄₅₀ the number of logs. In some cases, the number of clusters used may depend on, e.g., the resolution of expense categorization desired by a client (e.g., how many tiers of categorization are desired). The number of clusters will depend on the diversity of the client spend activities (e.g. the diversity of suppliers or expense types) and the level of granularity required for the categorization.

Figure 5:
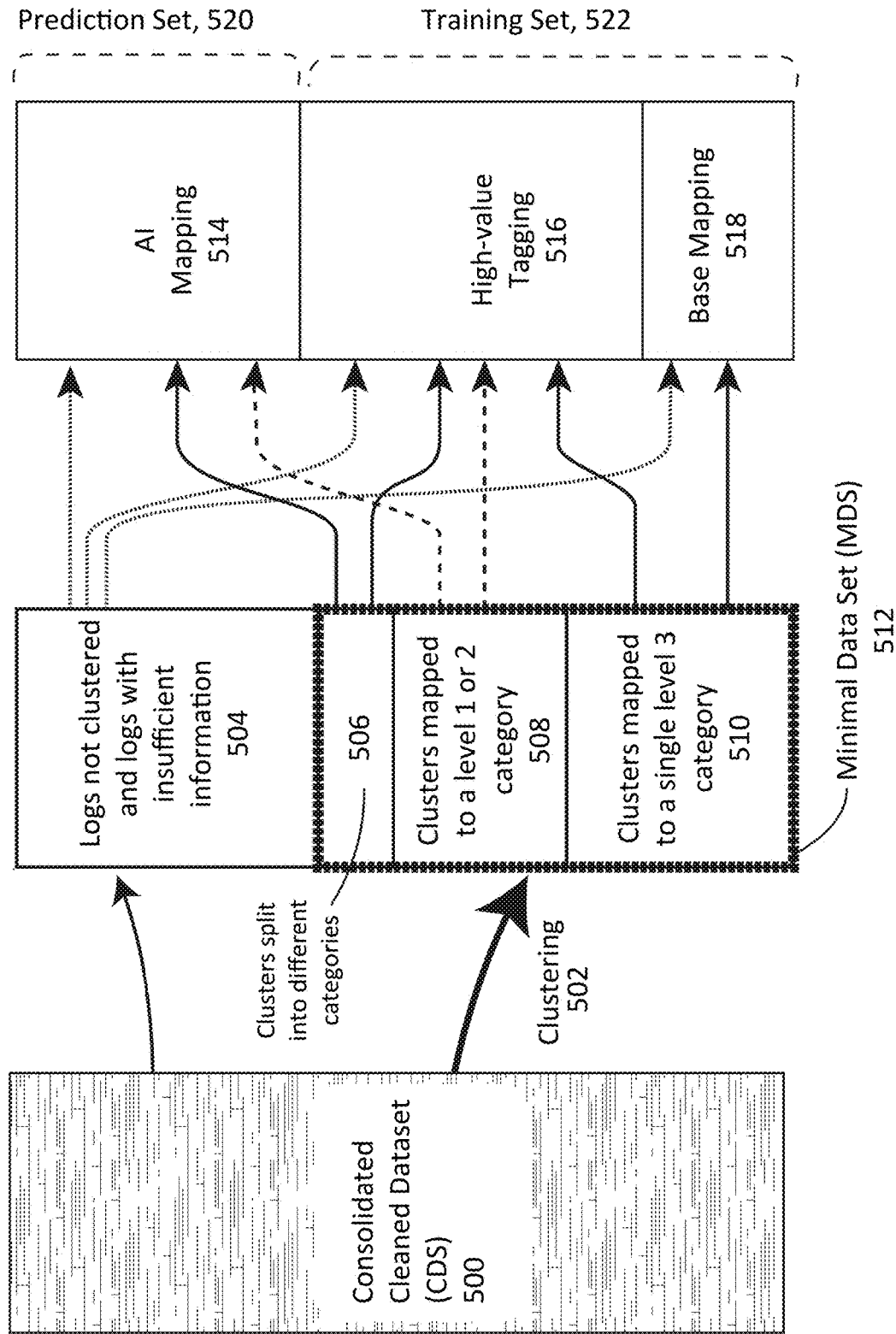
FIG. 5 illustrates aspects of clustering and categorizing expense logs.

FIG. 5 depicts aspects of clustering and categorizing expense logs when a three-tier category hierarchy is used such depicted in FIG. 1B. While explained in the context of a three-tier category hierarchy, it should be appreciated that the described process is also applicable to other category structures. Block 500 represents the consolidated cleaned data set (CDS) for expense logs in the cost database. Depending on the client and the period that the logs represent, this can represent millions of expense logs. Clustering (502) the logs from the CDS results in the minimal data set (MDS) 512 which constitutes cluster groups 506, 508, and 510. After the clustering, the log groups are analyzed with their respective client's account structure from the profit & loss statement, general ledger, AP and PO Accrual Reconciliation Report. Depending on the result of that analysis, the clusters are then split into cluster groups 506, 508, and 510 to facilitate the categorization effort. Logs in block 504 represent logs which cannot be clustered generally due to missing data.

Cluster group 510 includes clusters with logs that will all be mapped to a single level 3 category (i.e., they will be fully categorized) within the category structure. Each cluster in this group contains logs that share the same associated account structure from the profit & loss statement, general ledger, AP and PO Accrual Reconciliation Report. In other words, the associated spend data in the MDS is sufficient to provide at least at level 3 categorization for each cluster with high confidence. Generally, logs in group 510 represent the most complete logs in the client spend data.

Cluster group 508 represents clusters that can be collectively categorized to a level 1 or level 2 category. In this group, at least some logs or their associated account structure lack sufficient detail to fit within a defined category at the second or third level of the hierarchical category structure. In some cases, these categories may be placed within an "unmapped" category at the second or third level of the hierarchical category structure.

Cluster group 506 represents clusters containing logs that fit into different categories at the first, second, or third level of the hierarchical category structure. These clusters contain logs, which are associated with more than one account structure. This generally happens, when the data relevant for clustering might not contain sufficient detail to be able to distinguish categories on a level 3 granularity. For example, referring to the hierarchical category structure in FIG. 1B, a cluster in this group might have some logs which should be categorized under "Patent and Trademarks" and some logs which should be categorized under "Product Development." Such clusters might not represent actual groups of logs of the same spend type and might have to be split into sub-clusters using additional log context (such as the account structure) so that the respective expense logs of these sub-clusters all fall within a single level 3 category respectively.

Lastly, a final group 504 includes logs that could not be clustered due to insufficient or missing data that needed to be processed by the clustering algorithm. As discussed in detail elsewhere herein, some of these logs may be categorized by base mapping rules. In certain cases, the additional log context allows for some of these logs to be joined together with logs from another cluster. This is done using a machine learning algorithm using client context features. In some cases, these logs may be mapped by a user if, e.g., the log represents a significant portion of the client's spend. Generally, however, most logs in group 504 are categorized using a trained model. It should be noted that the depicted sizes of groups 504, 506, 508, and 510 are merely provided as example percentages of a client's spend. Individual cluster groups may take up a larger or smaller percentage of the client's spend based on factors such as the quality of the spend data, the clustering technique used, and the number of clusters generated.

After clustering, some clusters may be automatically categorized by a base mapping process 518. Base mapping can be based on rules that align to trusted client categories. In some cases, these mapping rules may be generated by categorizing the clients spend during a previous budgeting period using the disclosed methods. In some cases, these base rules may pertain to an industry sector or may be generic rules used by a variety of clients. In some cases, these base rules may be based on a specific account structure which has a direct level 3 categorization quality. In some cases, base mapping rules may be provided by a client or determined based upon an aspect of the client's practice.

As an illustrative example, one mapping rule would be to place clusters under the "airfare" category 110 (a level 3 category of the hierarchical category structure depicted in FIG. 1B) that include logs having a known keyword linked to this category such as "flight" or "air", 1 or 2 city fields, 1 or 2 time fields, a flight code, and a known air ticket supplier. These constraints would be representative of an arrival city (and possibly a departure city), an arrival time (and possibly a departure time), and flight code (e.g., two letters followed by 1-4 numbers) which might be listed on an invoice for an airline ticket. In some cases, the rule might also consider the cost associated with a log to see if it is within a price range that would be expected for flight expenses. This pattern could be determined from a respective cluster matrix which includes the log vectors of the logs in the matrix. For example, it might be determined that each log vector has a value superior or equal to 1 for a dimension corresponding to a number of cities, a value superior or equal to 1 for a dimension corresponding to a number of time fields listed on the invoice, a value of 1 for a dimension corresponding to a number of flight codes, and at least a value of 1 for the dimensions corresponding to the known keywords and suppliers that are linked to the airfare category. It should be appreciated that in some cases base mapping rules may be significantly more complex—often, rules for base mapping may be very specific to reduce the likelihood that logs will be miscategorized by a base rule. In some cases, however, these base mapping rules may also be relatively simple. For example, rules in some cases may depend only on a single keyword or supplier being associated with a cluster.

After the base rule-based mapping operations, a subset of the remaining clusters, representing high-value cluster groups, is automatically determined by an algorithm. The selection may be based on total cost carried per cluster, the number of transactions in a cluster, and/or the respective cluster's association to under- or over-represented categories to improve the machine learning model. The subset of high-value cluster groups may in some cases represent between 30% and 60% of the total spend and may represent cluster from each of cluster groups 504, 506, 508, and 510. These clusters are then categorized manually. For example, a representative log for a cluster may be provided to a user who determines a selection for how all of the logs in the cluster will be categorized. In some cases, the representative log may be determined automatically, e.g., by determining a log which represents an average or centroid of the cluster group. In some cases, a user may be asked to categorize several logs from a cluster. For example, if a cluster represents a sufficient percentage of the total spend, or if there is at least one clear dimension for dividing the cluster into two or more sub-clusters, then a user may be asked to verify that logs representing sub-clusters belong to the same category.

In some cases, the process of high-value tagging continues until a certain percentage of the total spend is categorized and/or until a threshold number of logs have been categorized into each category of a hierarchical category structure. In some cases, clusters may be selected from disperse portions of a cluster tree to reduce the number of selections a user is asked to provide for a threshold number of logs to be categorized in each category. This method follows the principle of Human-in-the-Loop (HITL), where predictions made by the model which are deemed insufficient are sent to a human for manual categorization.

Clusters and logs tagged manually or mapped via base mapping rules, are then used as a training set 522 to training a machine learning model. This model is used to categorize the remaining logs and clusters 514, also referred to as the prediction set 520. The prediction set of clusters represents a subset of the cluster groups 504, 506, and 508.

Figure 6:
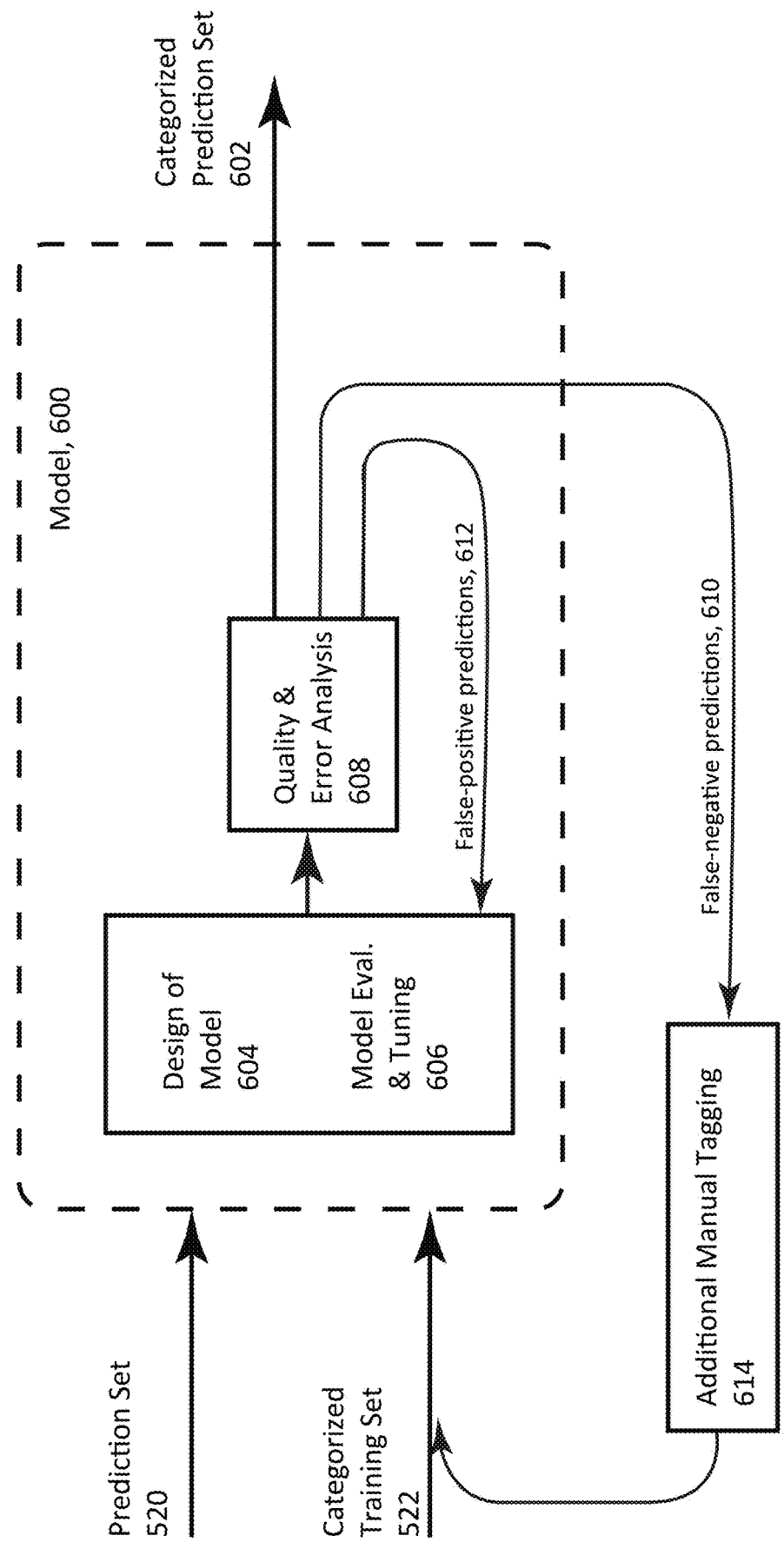
FIG. 6 illustrates aspects of a model that uses one or more machine learning techniques to predict categories for expense logs.

FIG. 6 depicts how a model 600 can be used to select appropriate categories for the prediction set of clusters. The model receives the training data 522 which has been categorized by the base mapping operations 518 and the high-value tagging 516. The training data is used to determine model parameters used for determining the category of a log or cluster based on associated data in the MDS. Once the model is trained and applied to the prediction set 520, it provides category predictions 602. The sets 520 and 522 provide the model with the log vector for each log. In some embodiments, only a subset of log data is provided to the model, and in some cases, additional spend data in the cost database can be provided to the model. In some cases, logs might also be withdrawn from the training set during model calibration to balance the likelihood of the categories from which it will learn (e.g., avoid that a specific category is over-represented).

In some cases, a model may evolve and become more accurate over time via an iterative process depicted in FIG. 6. This iterative process is driven by an automated quality and error analysis to improve the model. In addition, further manual tagging may be performed for logs with a low-quality category prediction. In operation 604 the model is designed. Designing the model may include, e.g., selecting what features in the log vectors to use as input variables and what model type or structure will be used. In some cases, the model may include one or more machine learning algorithms such as logistic regression models, linear discriminant analysis algorithms, classification and regression trees, Naive Bayes algorithms as in "Tackling the Poor Assumptions of Naïve Bayes Text Classifiers", J. D. M. Rennie, L. Shih, J. Teevan, D. R. Karger, Proceedings of the 20$^{th}$ International Conference on Machine Learning, 2003, K-nearest neighbors algorithms, learning vector quantization algorithms, support vector machines, Bagging, Boosting, Random Forests, XGBoost, LightGBM algorithms, artificial neural networks and the like. While some examples herein are given in the context of a deep learning model or a neural network model, it should be understood that other models or combinations of models familiar to those of skill in the art can also be used.

An example of a neural network model which may be used in some embodiments for predicting categories for individual logs or clusters of logs can take the form of any number of neural networks including Perceptron (P) networks, Feed Forward (FF) networks, Radial Basis Networks (RBF), Deep Feed Forward (DFF) networks, Recurrent Neural Networks (RNN), Long/Short Term Memory (LSTM) Networks, Gated Recurrent Unit (GRU) networks, Auto Encoder (AE) Networks, Variational AE Networks (VAE), Denoising AE Networks (DAE), Sparse AE Networks (SAE), Markov Chain (MC) Networks, Hopfield Networks (HN), Boltzmann Machine (BM) Networks, Restricted BM Networks (BRM), Deep Belief Networks (DBN), Deep Convolutional Networks (DCN), Deconvolutional Networks (DN), Deep Convolutional Inverse Graphics Networks (DCIGN), Generative Adversarial Networks (GAN), Liquid State Machine (LSM) Networks, Extreme Learning Machine (ELM) Networks, Echo State Networks (ESN), Deep Residual Networks (DRN), Kohonen Networks (KN), Support Vector Machine (SVM) Networks, Neural Turing Machine (NTM) Networks, and the like. In some cases, a model is based on more than one machine learning model or algorithm.

In operation 606 the model is trained using the training data set. Training can include any number of machine learning techniques known to those of skill in the art. For example, models can be generated and trained in Python using the scikit-learn toolkit or can be trained using libraries such as TensorFlow, Keras, MLib, gensim and the like. During training, the parameters of the models are learned by Machine Learning algorithms from the categorized training set, and the various model hyperparameters can be determined and/or optimized by using different techniques like grid search, cross-validation and Bayesian optimization to increase the chosen metrics of the model.

In operation 608, a quality and error analysis of the model is automatically performed. In some cases, a quality and error analysis can occur after the prediction set 520 is categorized to verify that logs are being mapped correctly. In some cases, the quality and error analysis can be done periodically or continually while categorizing the prediction set 520. If it is determined that a model is mispredicting categories, the model may be updated by revising the design of the model 604. There also may be an automated adjustment of hyperparameters related to the given categories 606 (e.g., if false-positive predictions are detected). Or there also may be additional manual tagging for these specific categories 614.

There are a number of manual and automatic ways to check that the model 600 can be verified for prediction quality. For example, predicted categories can be checked with the expected spend distribution for each category based on the client's account structure. There are several other distribution calculations that can be used in combination, such as keyword frequency distribution, item cost distribution, etc. Additionally, test subsets of the training set can be used to obtain good measures of the chosen metric (for example accuracy, weighted accuracy, precision or recall).

In addition, training test subsets can be used to compare automated predictions to actual tagging and to characterize errors in each category in terms of the log vector. In some cases, a log may provide a confidence metric with each category prediction. In some cases, a confusion matrix can characterize errors by comparing the predictions with actual categories (such as false-positives or false-negatives).

In some cases, a user may be requested to verify a category determined for a log when an associated confidence metric is below a threshold. In some cases, totals spend values in categories may be checked as a sanity check. In some embodiments, if a spend value for a particular category exceeds a certain predetermined range (e.g., defined as a percentage of the total spend), then a user can be alerted and requested to spot check logs and clusters being assigned to that category.

If the confidence metric of the prediction is deemed insufficient in operation 608, for example below a certain threshold, the machine learning algorithm can either adjust the model hyperparameters or identify additional logs to be categorized manually. In cases of false-positive predictions, where it is determined that the model has wrongly predicted logs in one category (e.g., if it is determined that the spend for one category significantly exceeds an expected value), the model design and tuning parameters can be adjusted 612 to correct for the error. In some cases, the model can get closer to an expected distribution by adjusting machine learning weights. In some cases, fine-tuning of other model parameters can result in the reduction of false-positives.

False-negative predictions refer to situations where the model has failed to place a log in the appropriate category. In some cases, confusion matrices can be used to identify logs that are mispredicted or likely mispredicted by the machine learning model. These identified logs can then be provided to a user to tag the category of the log correctly. Manually tagged logs can then be added to the categorized training set 522 and used to further train the model, or in some cases, modify the design of the model.

Categorization predictions that pass a certain threshold of the confidence metric are considered categorized in operation 602. For all other log clusters, the cycle of model design, tuning and quality & error analysis is iteratively repeated until, e.g., 95-100% of the spend is categorized.

Figure 7:
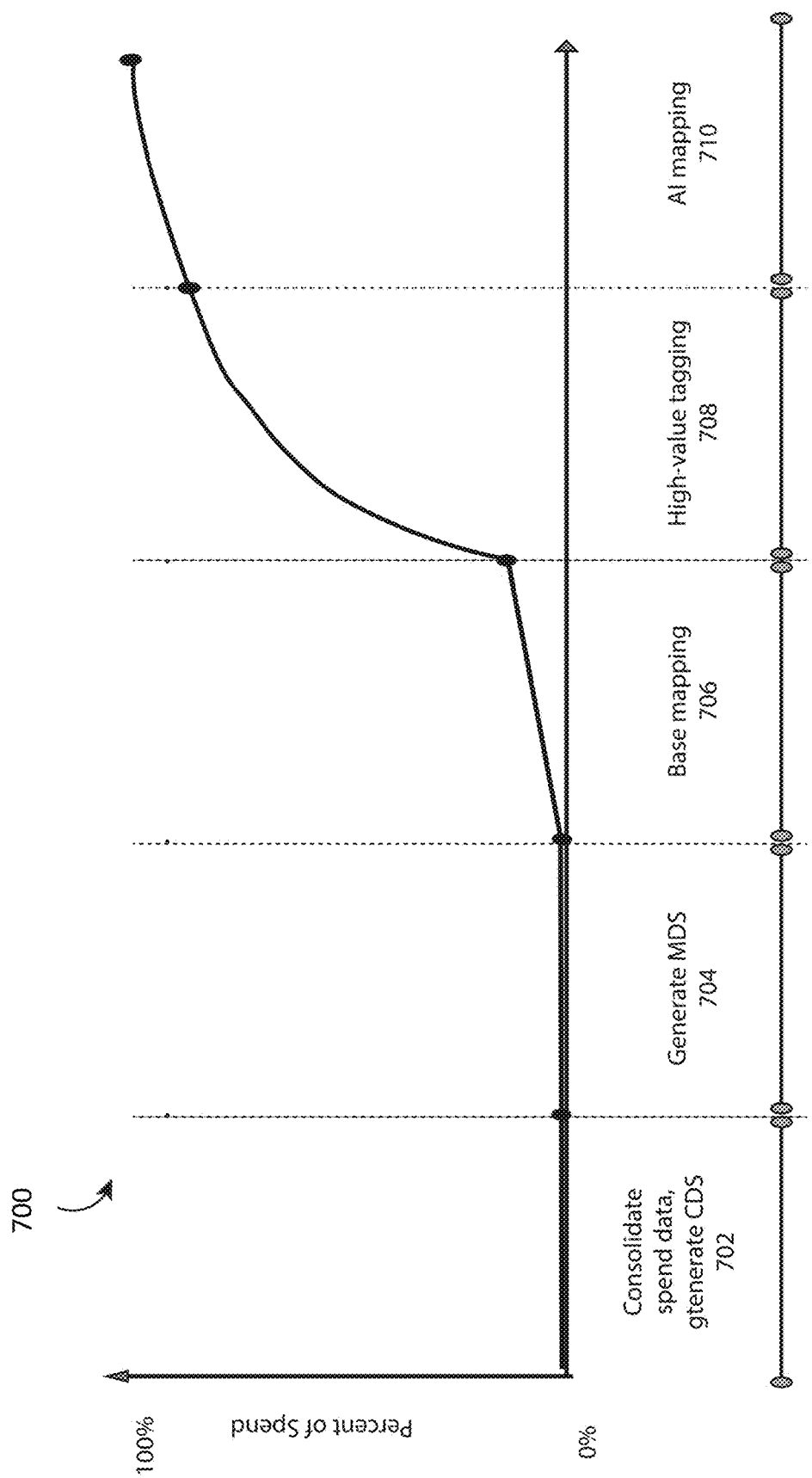
FIG. 7 is a plot providing one example of how spend data might be categorized during base mapping, high-value tagging, and AI mapping phases of methods described herein.

FIG. 7 depicts a chart 700 illustrating how spend data can be categorized during the mapping phases described herein. It should be noted that this chart is illustrative and that certain embodiments may include additional phases or may have fewer phases. In certain embodiments, the depicted may overlap such as when base mapping and high-value tagging occur at the same time.

In phase 702 the raw spend data is received from a client and consolidated in the cost database. As discussed, this may include operations such as digitizing and/or recognizing text in documents, joining data fields, conversion into a standardized target schema and reconciliation of negative and out-of-scope spend. The data is then consolidated, cleaned (e.g., corrupt and duplicate logs are removed), and various natural language processing operations are applied to recognize text, resulting in the consolidated cleaned data set (CDS). In phase 704 the minimal data set (MDS) is generated using various clustering techniques on the CDS multi-dimensional logs. In operation 706, base mapping rules are applied to automatically map logs to level 3 cost categories. In some cases, this phase can account for, categorizing about 10%-20% of the total spend. In cases, where an in-depth knowledge of a client's practice is known or where the disclosed categorization processes have been performed for a prior budgeting period, a higher percentage of the total spend may be tagged for during this phase.

After the base mapping phase, high-value clusters are tagged manually in operation 708. As described, this can include requesting that a user, such as an accountant, manually tag one or more logs from each high-value cluster. At the end of the high-value tagging phase, a majority of the total spend may be accounted for, although this need not be the case in all circumstances. Finally, in the last phase 710, logs corresponding to the remaining spend are categorized using a machine learning model. The model may be trained with the logs categorized in previous phases, logs categorized during previous budgeting periods, or in some cases using pre-trained models based on categorizations for other clients in the same field of industry. In some cases, at the end of phase 710 more than 95% of the spend data can be characterized to a level three category of the hierarchical category structure. In order to achieve a high level of categorized logs with high quality and confidence, a process called Human-in-the-loop is used. This process is built on the concept of "active learning", a special case of semi-supervised machine learning. In some cases, an automated algorithm can determine the model performance for certain categories to be below a certain threshold. In such cases, depending on the analysis, the model can either auto-tune the model hyper-parameters or select specific logs or clusters that should be manually tagged by a human expert. After such action changes are fed back to the system and the model is run again as well as the performance analysis until 95%-100% of the spend is categorized at level three.

Figure 8:
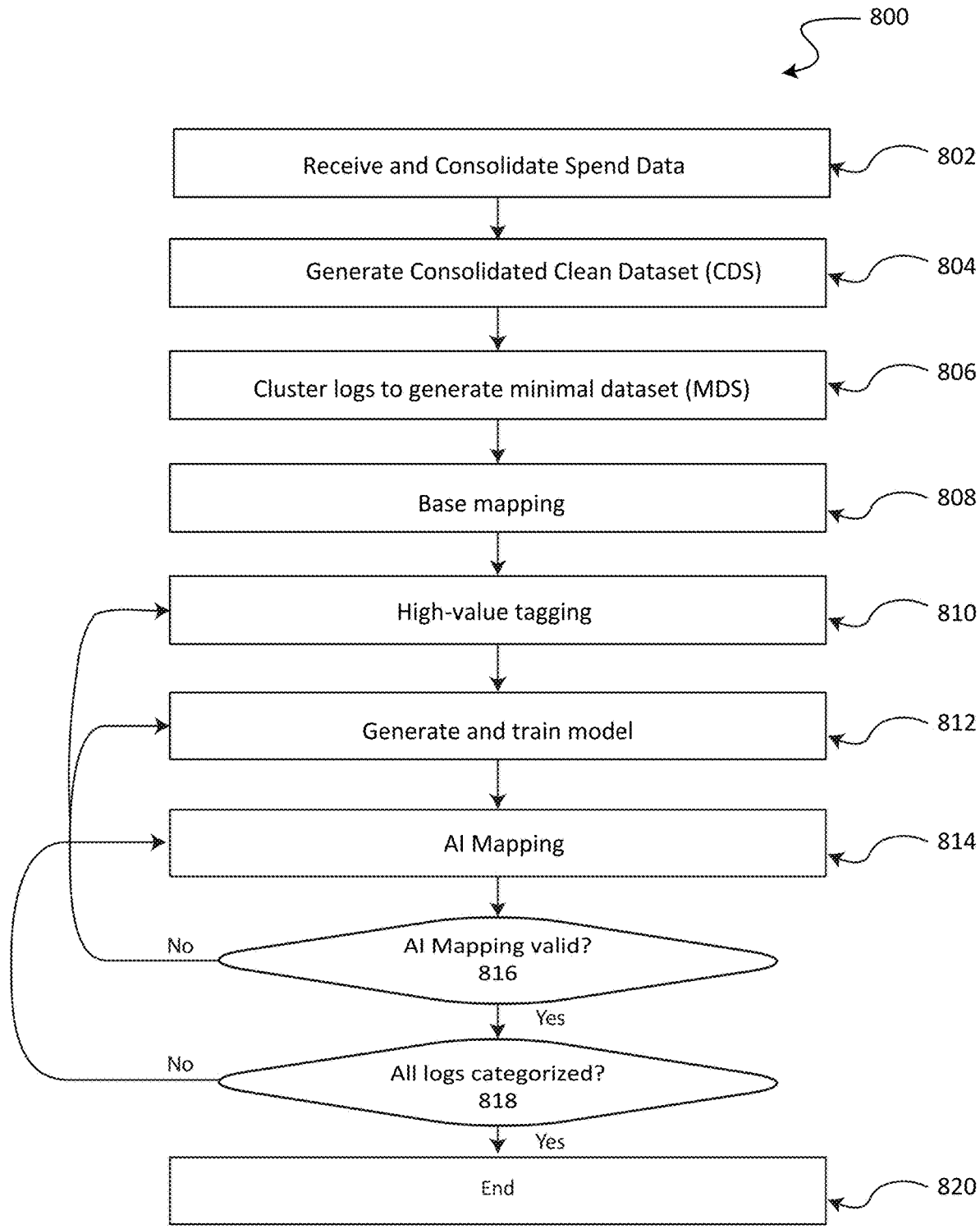
FIG. 8 provides a method for categorizing spend data which can be used in some embodiments.

FIG. 8 illustrates a method 800 that can be used to classify and categorize spend data. It should be understood that, for this and other processes discussed herein, there can be additional, fewer, or alternative steps, performed within the scope of the various embodiments unless otherwise stated. In operation 802 the raw spend data is received from a client. This can include receiving receipts, invoices, and other documentation of costs incurred. When the data is received, it is also consolidated into a single data set or database such as an SQL database. This operation can include, e.g., digitizing and recognizing text associated with expense logs, joining data fields, conversion into a standardized target schema and reconciliation of negative and out-of-scope spend. In operation 804 the consolidated cleaned data set (CDS) is created. As described elsewhere, creating the CDS involves various natural language processing operations used to remove data deemed unnecessary or unhelpful for clustering and categorization. Data that is not removed is cleaned to improve analysis used for clustering and categorization. For example, each word associated with a log can be replaced by its base dictionary form. In operation 806 the CDS logs are clustered to generate the MDS. The MDS contains groups of logs that come from transactions of the same nature that should fall into the same spend category. The clustering method is adjusted to each application case, considering the available data and level of granularity of clusters required. Generating the MDS reduces the computational demand needed to cluster logs and predict categories for spend data.

Following the clustering operation, expense logs may be categorized (or tagged) in clusters. For example, a representative log for a MDS cluster can be categorized causing each of the other logs in the same cluster to be provided the same category designation. Categorizing as logs at the cluster level rather than categorizing each log individually dramatically reduces the number of category decisions needed and speeds up the time to categorize a client's spend data. The first mapping operation 808 corresponds to categorizing logs and clusters based on whether they satisfy a set of predetermined rules. Generally, these rules tend to be overly specific such that logs are only rarely, if ever, categorized incorrectly.

A high-value tagging operation 810 is then done on cluster groups representing a proportionally high percentage of the total spend, or a high number of logs in a cluster, or association with under-represented categories. The classification in operation 810 is done manually by trained personnel. As human selection is the gold standard of accuracy for categorization, accounts are focused on classifying the high-value clusters, as these decisions represent a more substantial portion of the total spend. In some cases, high-value tagging can include requesting that a user properly categorize a representative invoice from each of a set of high-value clusters. Upon receiving the user category selection for a representative log, each of the other logs in the cluster can be given the same category designation. In some cases, such as when it is determined that a cluster can be easily subdivided along one or more dimensions, a user can be requested to categorize more than one representative logs from each cluster. If the user categorizes representative logs from the same cluster into discrete categories, the cluster may be split into sub-clusters which are categorized using the discrete category selections provided by the user.

Following base mapping and high-value tagging of operations, a model is generated and trained 812 using the logs classified in the prior tagging operations. The trained model is then used to categorize the remaining logs in operation 814. In some embodiments, the model may be used to categorize the remaining clusters, and in some cases, the model may be used to categorize the remaining logs individually. In some cases, the model may be used to categorize remaining logs automatically based on associated log vectors.

In operation 816, the categories predicted using the model are validated. Validation can be an automated process that can that look for unexpected trends in spend categorization or violations of base mapping rules. In some cases, if a value of a spend category exceeds an expected value due to category predictions by the model, a user may be requested to verify the category predictions provided by the model. For instance, if a category has exceeded an expected budget by an amount corresponding to a cluster assigned to the category by the model, then a user may be requested to determine whether the particular cluster has been correctly categorized. Additional user input can be, e.g., a HITL iterative process, and may resemble what is asked of a user in operation 810. If categorizations are corrected by a user, this information can be used for further training of the model in operation 812. In some cases, each log which has been categorized using the trained model may be re-categorized if the model has been updated or re-trained as mentioned elsewhere. In operation 818, it is determined whether all the logs are categorized. In some cases, all or a substantial portion of the logs must meet a predetermined confidence threshold in order for the process to be completed. If some logs have not yet been categorized, the process returns to operation 814. If all the logs are categorized, or if the only remaining logs have insufficient information to be provided any category designation, then the process is completed 820. In cases where there are remaining logs with insufficient information, these logs may be presented to a user to determine an appropriate category designation.

After all the logs have been designated to a category, the categorized spend data is provided to the client. In some cases, the categorization data is added to the cost database which can then be provided to the client. If a client is using an application such as depicted in FIG. 1B to explore the categorized data, the client may, in some cases, be able to access specific log information such as the text included on an invoice or an image of an invoice. In some cases, a client application such as depicted in FIGS. 1A and 1B may provide options for a user to correct miscategorized data or make edits to the hierarchical category structure. In some cases, this information can be anonymized, sanitized and used to generate model weights for other clients in the future (e.g., other clients in the same business sector). In some cases, base mapping rules might be updated so that items are categorized with even greater accuracy in future budgeting periods or other clients. Any information that is saved or otherwise used to improve mapping categorization for other clients is anonymized and sanitized such that no possibility exists to trace sensitive information back to a client. Using artificial neural networks, this can be done by removing certain layers of the model.

While the above examples have been provided in the context of categorizing spend data, it should be appreciated that the disclosed methods may be applicable for organizing various data sets into a hierarchical category structure. The disclosed methods may provide advantages over other categorization methods in situations when significant amounts of data needs to be sorted, when there are few pre-established rules for sorting the data, and, e.g., when the goal of the categorization is to determine patterns in the data. In the context of ZBB, the methods described are primarily used for indirect spend, marketing & sales. It can also be used for other cost types like raw materials and supply chain. In addition, not only operational expenditure (OPEX) but also capital expenditure (CAPEX) might be considered as spend data.

The operations of method 800 are implemented using software, and accordingly one of the preferred implementations of the invention is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

What is claimed is:

1. A computer-implemented method for processing transaction records, comprising:

receiving transaction data;

generating, based on the transaction data, a cleaned data set (CDS) comprising a plurality of logs for a plurality of transactions from the transaction data, wherein individual ones of the plurality of logs are associated with text;

clustering at least a subset of the plurality of logs from the CDS based at least in part on the associated text and a similarity threshold, wherein the clustering results in a set of clusters;

identifying a particular subset of the set of clusters having one or more of the plurality of logs to be categorized with different transaction types, based at least in part on one or more metrics of the set of clusters;

determining a representative log to represent a centroid of individual clusters of the particular subset based at least in part on one or more metrics of the plurality of logs in the individual clusters of the particular subset;

receiving a user determination of an individual transaction type of the different transaction types for the representative log in the individual clusters of the particular subset;

assigning, in the individual clusters, the individual transaction type of the representative log to individual logs, based, at least in part, on a context between the individual logs and the representative log that allows the individual logs to be joined together across the particular subset;

training a prediction model using the individual logs from the particular subset and their associated transaction types;

determining, using the prediction model, one of the different transaction types, for the plurality of logs in the CDS not yet associated with a transaction type; and generating a transaction report, the transaction report comprising a plurality of calculated parameters determined based at least in part on the plurality of logs and their associated transaction types that comprise the determined one of the different transaction types from the prediction model.

2. The computer-implemented method of claim 1, further comprising:

identifying an additional subset of the set of clusters; and determining, using a set of base mapping rules, further transaction types of the different transaction types to be associated with the plurality of logs of the additional subset of clusters, wherein training the prediction model further comprises training the prediction model using the plurality of logs from the additional subset and their further associated transaction types.

3. The computer-implemented method of claim 1, wherein identifying the particular subset comprises selecting clusters for the subset based at least in part on a transaction value associated with each cluster.

4. The computer-implemented method of claim 1, wherein identifying the particular subset comprises selecting clusters based at least in part on a distance metric between respective clusters of the set of clusters.

5. The computer-implemented method of claim 1, wherein generating the CDS comprises removing out-of-scope or duplicate ones of the plurality of logs.

6. A computer-implemented method for processing transaction records, comprising:

receiving transaction data comprising a plurality of logs, the plurality of logs having associated text;

clustering at least a subset of the plurality of logs based on the associated text and a similarity threshold, wherein the clustering results in a set of clusters;

identifying a particular subset of the set of clusters having one or more of the plurality of logs to be categorized with different transaction types, based at least in part on one or more metrics of the set of clusters;

determining a representative log to represent a centroid of individual clusters of the particular subset based at least in part on one or more metrics of the plurality of logs in the individual clusters of the particular subset;

receiving a user determination of an individual transaction type of the different transaction types for the representative log in the individual clusters of the particular subset;

assigning, in the individual clusters, the individual transaction type of the representative log individual logs, based, at least in part, on a context between the individual logs and the representative log that allows the individual logs to be joined together across the particular subset;

training a prediction model using the individual logs from the particular subset and their associated transaction types; and predicting one of the different transaction types for additional logs of the plurality of using the prediction model.

7. The computer-implemented method of claim 6, further comprising:

identifying an additional subset of the set of clusters; and determining, using a set of base mapping rules, further transaction types of the different transaction types to be associated with the plurality of logs of the additional subset of clusters, wherein training the prediction model further comprises training prediction model using the plurality of the logs from the additional subset and their further associated transaction types.

8. The computer-implemented method of claim 6, the method further comprising:

generating a cleaned data set (CDS) from the plurality of logs, wherein generating the CDS comprises processing at least a portion of the associated text associated with the plurality of logs using natural language processing (NLP).

9. The computer-implemented method of claim 8 wherein generating the CDS further comprises removing out-of-scope or duplicate ones of the plurality of logs from the plurality of logs.

10. The computer-implemented method of claim 6, further comprising:

providing for display the representative log in the individual clusters of the particular subset prior to receiving the user determination of the individual transaction type of the different transaction types for the individual clusters of the particular subset.

11. The computer-implemented method of claim 6, further comprising:

providing, for display, two representative logs in the individual clusters of the particular subset;

receiving different user determinations of the different transaction types for the two representative logs; and splitting one of the individual clusters based at least in part on the different user determinations for the transaction types.

12. The computer-implemented method of claim 6, further comprising:
validating the predicted one of the different types provided by the prediction model for additional logs using a Human-in-the-Loop method.

13. The computer-implemented method of claim 6, wherein identifying the particular subset comprises selecting clusters for the subset based at least in part on a transaction value associated with each cluster.

14. The computer-implemented method of claim 6, further comprising:
performing an automated quality and error analysis of the predicted one of the different transaction types; and
modifying at least one model parameter of the prediction model based on the quality and error analysis.

15. The computer-implemented method of claim 6, further comprising:
performing an automated quality and error analysis of the predicted one of the different transaction types;
identifying one or more of the plurality of logs for manual tagging based on the quality and error analysis; and
receiving the user determination of the individual transaction type of the different transaction types for each of the one or more of the plurality of logs.

16. The computer-implemented method of claim 6, further comprising:
training the prediction model using the individual logs and their associated transaction types.

17. The computer-implemented method of claim 6, wherein predicting one of the different transaction types for the additional logs results in logs being associated with more than 95% of the plurality of logs.

18. The computer-implemented method of claim 6, further comprising using the prediction model to predict one of the different transaction types for another plurality of logs from other transaction data.

19. A non-transitory computer-readable storage medium comprising instructions for processing transaction records, the instructions when executed by a processor causing the processor to:
receive transaction data comprising a plurality of logs, the plurality of logs having associated text;
cluster at least a subset of the plurality of logs based on the associated text and a similarity threshold to result in a set of clusters;
identify a particular subset of the set of clusters having one or more of the plurality of logs to be categorized with different transaction types, based at least in part on one or more metrics of the set of clusters;
determine a representative log to represent a centroid of individual clusters of the particular subset based at least in part on one or more metrics of the plurality of logs in the individual clusters of the particular subset;
receive a user determination of an individual transaction type of the different transaction types for the representative log in the individual clusters of the particular subset;
assign, in the individual clusters, the individual transaction type of the representative log individual logs, based, at least in part, on a context between the individual logs and the representative log that allows the individual logs to be joined together across the particular subset;
train a prediction model using the individual logs from the particular subset and their associated transaction types; and
predict one of the different transaction types for additional logs of the plurality of using the prediction model.

20. The non-transitory computer-readable storage medium of claim 19, wherein the instructions that when executed by the processor further cause the processor to:
identify an additional subset of the set of clusters; and
determine, using a set of base mapping rules, further transaction types of the different transaction types to be associated with the plurality of logs of the additional subset of clusters, wherein training the prediction model further comprises training prediction model using the plurality of the logs from the additional subset and their further associated transaction types; and
train the prediction model using the plurality of logs from the additional subset and their further associated transaction types.

* * * * *